United States Patent [19]

Camizuli

[11] Patent Number: 5,129,670
[45] Date of Patent: Jul. 14, 1992

[54] DEVICE FOR CORRECTION OF THE TRIM ATTITUDE OF AN AUTOMOTIVE VEHICLE

[75] Inventor: Alain Camizuli, Colombes, France

[73] Assignees: Automobiles Peugeot; Automobiles Citroën, France

[21] Appl. No.: 646,075

[22] Filed: Jan. 25, 1991

[30] Foreign Application Priority Data

Jan. 30, 1990 [FR] France .................. 90 01085

[51] Int. Cl.⁵ .................. B60G 11/26; B60S 9/00
[52] U.S. Cl. .................. 280/707; 280/6.12; 280/709; 280/DIG. 1
[58] Field of Search .................. 280/707, 112.2, 6.12, 280/DIG. 1, 703, 772, 709

[56] References Cited

U.S. PATENT DOCUMENTS

| | | | |
|---|---|---|---|
| 4,798,369 | 1/1989 | Geno et al. ................... | 280/707 |
| 4,804,203 | 2/1989 | Glab et al. ................... | 280/707 |
| 4,892,329 | 1/1990 | Kozaki et al. | |
| 4,924,393 | 5/1990 | Kurosawa .................. | 280/703 |
| 4,973,078 | 11/1990 | Barthelemy et al. ............ | 280/707 |
| 4,986,568 | 1/1991 | Galtier et al. ................ | 280/772 |

FOREIGN PATENT DOCUMENTS

1-60413  3/1989  Japan .
1-74115  3/1989  Japan .
WO89/04262  5/1989  PCT Int'l Appl. .

*Primary Examiner*—Charles A. Marmor
*Assistant Examiner*—Paul Dickson
*Attorney, Agent, or Firm*—Ostrolenk, Faber, Gerb & Soffen

[57] ABSTRACT

A trim attitude correcting device for an automotive vehicle comprising three sensors detecting the angle of the steering wheel of the vehicle, the angular position of the end of an anti-banking bar connected to the rod of a jack made fast to a road wheel support in the vertical position of the wheel support onto which the casing of the jack is pivotally mounted, respectively, the signals from these three sensors being received by a computer designed to limit the length of the jack through the medium of a hydraulic regulator when the angle of the steering wheel corresponds to a steering lock of the road wheels close to the maximum and the jack or the associated end of the anti-banking bar is likely to hit a neighboring part.

4 Claims, 1 Drawing Sheet

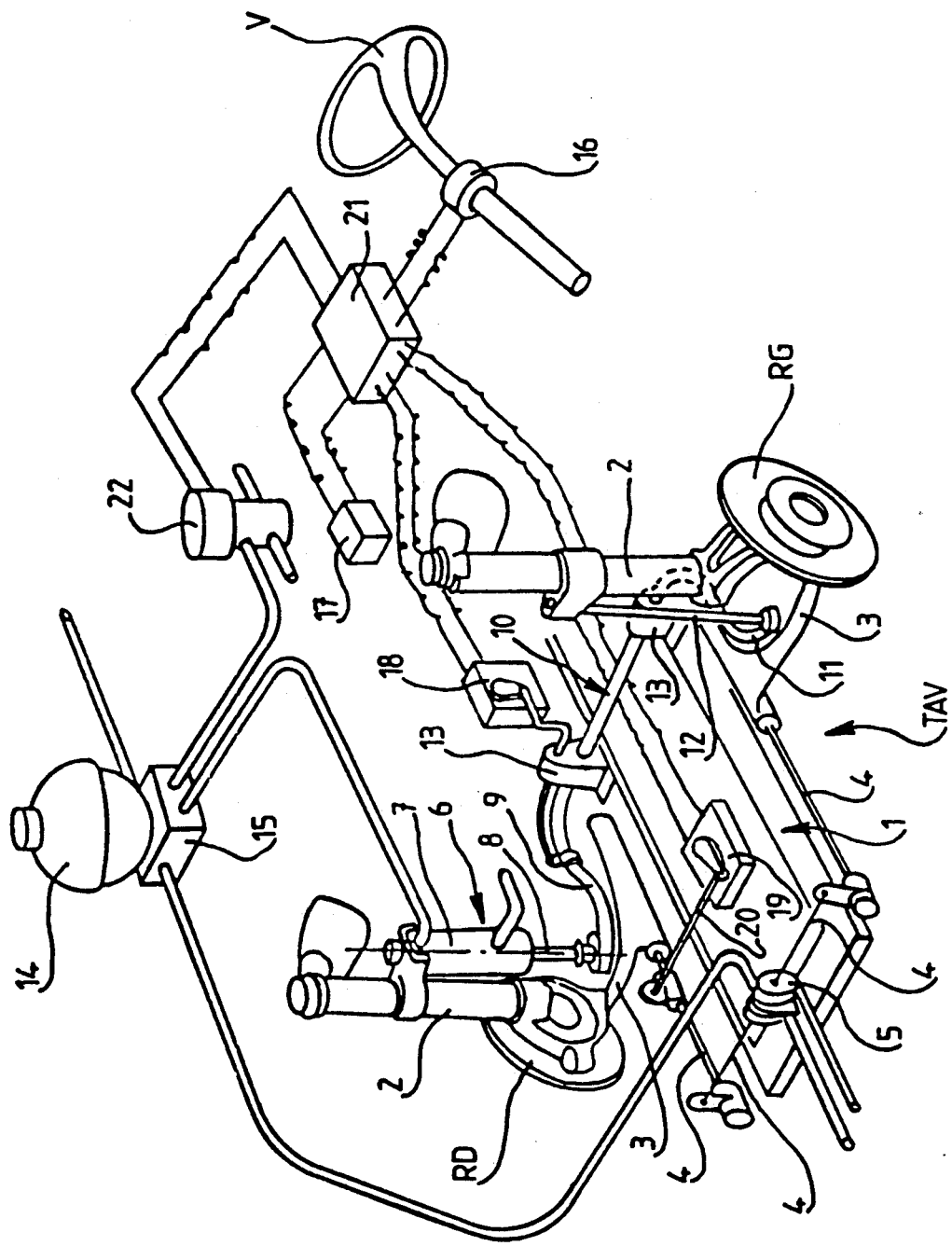

DEVICE FOR CORRECTION OF THE TRIM ATTITUDE OF AN AUTOMOTIVE VEHICLE

BACKGROUND OF THE INVENTION

The present invention relates to a device for the correction of the trim attitude of an automotive vehicle.

There is already known, for instance, from commonly owned U.S. patent application Ser. No. 07/387,581 applied for on Jul. 31, 1989, now U.S. Pat. No. 4,973,078, trim attitude correction devices for an automotive vehicle which comprise in particular, a steering front road wheel axle assembly, the supports of which are each connected to the body of the vehicle by an arm mounted in swinging relationship with respect to the body about an axis substantially parallel to the longitudinal axis of the vehicle. An anti-banking or anti-sway bar pivotally mounted on the body transversally of the longitudinal axis of the vehicle is connected by its two opposite ends to both wheel support, respectively, through the medium of a jack or like actuator provided on at least one of the two wheel supports and the length of which is controlled by a regulator itself operated by a computer responsive to the signals from several sensors, detectors or pickups one of which detects the angle of the steering wheel of the vehicle.

In these so-called active anti-banking systems the connected ends of the anti-banking bar and of the jack or actuator may undergo substantial displacements with respect to the surrounding parts which are likely thereby to be hit by the parts undergoing displacement.

SUMMARY OF THE INVENTION

Therefore the object of the present invention is to cope with the above-mentioned inconvenience by providing an apparatus which solves the problem of the displacements of the anti-banking bar and of the actuator or jack which are too large and detrimental to the surrounding parts.

The above and other objects of the invention are achieved by a device for the correction of the trim attitude of an automotive vehicle which is of the type defined hereinabove and wherein a computer receives signals from at least two other sensors or pickups detecting the angular position of the end of the anti-banking bar connected to the rod of the jack and the vertical position of the road wheel support onto which is pivotally mounted the casing of the jack, respectively, and the computer is designed so as to limit the length of the jack through the agency of a regulator when the angle of the steering wheel corresponds to a steering lock of the road wheels close to the maximum and the end of the anti-banking bar or that portion of the jack which is connected thereto is likely to hit a surrounding part.

It should be specified here that the signals from the sensor detecting the angle of the steering wheel and from the aforesaid two other sensors are compared with a program stored in a memory in the computer so as to determine the limitation of the length of the jack associated with at least one of the supports of the road wheels.

BRIEF DESCRIPTION OF THE DRAWINGS

The invention will be better understood and further objects, features, details and advantages thereof will appear more clearly in the following explanatory description which follows with reference to the accompanying diagrammatic drawing given by way of non-limiting example only and illustrating one presently preferred specific embodiment of the invention and in which the single FIGURE is a perspective view of the front road wheel axle assembly of an automotive vehicle comprising the improvements according to the invention.

DETAILED DESCRIPTION

The FIGURE shows the front road wheel axle assembly TAV of an automotive vehicle which is fitted with two steering road wheels, namely a right one RD and a left one RG connected to the body of the vehicle designated generally at 1.

Both road wheels are each one made fast to supports 2 connected to the body 1 of the vehicle by an arm 3 mounted for swinging motion with respect to the body 1 about an axis substantially parallel to the longitudinal axis of the vehicle.

According to the examplary embodiment shown, a set of links 4 operated by the oscillations of the arms 3 actuates a hydraulic valve 5 connected by a hydraulic circuit to a jack or like actuator 6, the casing 7 of which is pivotally connected to one of the wheel supports 2, namely the support of the right front wheel according to the example shown and the rod 8 of which is pivotally connected to one 9 of the ends of an anti-banking bar 10 the other end of which is rigidly connected to the support 2 of the left wheel RF through the medium of a rigid rod 12 for instance.

The anti-banking bar 10 is pivotally mounted on the body 1 of the vehicle transversally of the longitudinal axis of this vehicle and this through the agency of bearings 13 secured to the body 1.

The hydraulic circuit connecting the hydraulic valve 5 to the jack 6 is fitted with a hydraulic sphere 14 associated with a regulator 15 controlled by sensors or detectors which allow or do not allow the communication of the hydraulic circuit with the sphere 14.

At 16 is shown a sensor or pickup detecting the angle of the steering wheel V as well as the rotational speed of this wheel and at 17 is shown a sensor or pickup detecting the linear speed of the vehicle.

According to the invention there is further provided a sensor 18 detecting the angular position of the end 9 of the anti-banking bar 10 connected to the rod 8 of the jack 6 and there is also further provided another sensor 19 detecting the angular or vertical position of the wheel support 2 onto which is pivotally mounted the jack 6, i.e. the support of the right wheel according to the example illustrated.

It should be pointed out here that in the example shown, the sensor 19 is connected by a link or the like 20 to a link 4 made fast to the arm 3 associated with the support 2 of the right wheel RD.

The sensors 16, 17, 18 and 19 are connected to a computer 21 likely to operate an electromagnetic valve 22 connected to the regulator 15.

The limitation of the length of the jack 6 will be controlled by signals originating from the three sensors 16, 18 and 19 and which are compared with a program stored in a memory within the computer 21.

In other words, this computer 21 will permit the limiting of the motion amplitudes of the jack 6 through the medium of the regulator 15 when the angle of the steering wheel V will correspond to a steering lock of the road wheels RD, RG close to the maximum and therefore the end 9 of the anti-banking bar 10 or that portion of the jack which is connected thereto would be likely to hit a surrounding or neighbouring part.

It should be understood that the invention is not at all limited to the embodiment described and illustrated which has been given by way of example only.

Thus the angular sensor 18 connected to the end 9 of the anti-banking bar 10 toward the jack 6 could be substituted for by a linear sensor parallel to or integrated into said jack 6.

The invention therefore includes all the technical equivalents of the means described as well as their combinations if the latter are carried out according to its gist and within the scope of the appended claims.

What is claimed is:

1. A device for the correction of the trim attitude of an automotive vehicle comprising an assembly of two steering road wheels fastened to respective supports, each support being coupled to the body of the vehicle by an arm mounted for swinging motion with respect to the body about an axis substantially parallel to the longitudinal axis of the vehicle, and anti-banking bar pivotally mounted to the body substantially transversely of said longitudinal axis of the vehicle and connected at two opposite ends thereof to the respective wheel supports, extendible actuating means provided on at least one of the two wheel supports for connecting an end of the anti-banking bar to said one of the wheel supports, the extension of the actuating means being controlled by a regulator operated by a computer connected to a plurality of sensors, one of said sensors detecting the angle of the steering wheel of the vehicle, said computer receiving, signals from at least two other sensors detecting, respectively the angular position of the end of the anti-banking bar connected to the actuating means and the vertical position of the wheel support to which the actuating means is pivotally mounted, the computer comprising means for limiting the extension of the actuating means, the regulator being responsive to said computer, and, when the angle of the steering wheel corresponds to an angle of the road wheels which is close to a maximum and at least one of said end of the anti-banking bar or the actuating means which is connected thereto is likely to make contact with an adjacent part of the automotive vehicle, the signals from the three aforesaid sensors are utilized by a program stored in a memory of the computer so as to limit the extension of the actuating means so as not to contact the adjacent part.

2. The device of claim 1, wherein said sensor for detecting the angle of the steering wheel further comprises means for detecting the rotational speed of the steering wheel.

3. The device of claim 2, further comprising a sensor detecting the linear speed of the vehicle and for supplying a signal corresponding to said speed to said computer.

4. The device of claim 1, wherein the other end of said anti-banking bar is coupled to its respective wheel support by a fixed rod.

* * * * *